United States Patent [19]

Shigenatsu et al.

[11] Patent Number: 5,526,832
[45] Date of Patent: Jun. 18, 1996

[54] CARRYING APPARATUS FOR A THIN SHEET-LIKE WORKPIECE

[75] Inventors: Chiaki Shigenatsu; Masami Nishihara, both of Shizuoka, Japan

[73] Assignee: Fuji Seiki Machine Works, Ltd., Shizuoka, Japan

[21] Appl. No.: 497,462

[22] Filed: Jun. 30, 1995

[30] Foreign Application Priority Data

Jul. 1, 1994 [JP] Japan ................................ 6-171627

[51] Int. Cl.$^6$ ................................................ B08B 13/00
[52] U.S. Cl. .............................. 134/64.00 R; 134/122 R; 134/75; 134/66; 198/406; 198/379
[58] Field of Search ..................... 134/64 R, 122 R, 134/199, 61, 75, 66, 67, 83; 198/379, 345.1, 406, 803.8; 15/77

[56] References Cited

U.S. PATENT DOCUMENTS

| | | | |
|---|---|---|---|
| 2,919,705 | 1/1960 | Vitense | 134/122 R |
| 2,921,008 | 1/1960 | Hauck et al. | 134/83 |
| 2,942,719 | 6/1960 | Bofinger et al. . | |
| 3,620,153 | 11/1971 | Kennigton | 134/64 R X |
| 3,643,670 | 2/1972 | Sabatka et al. . | |
| 4,155,815 | 5/1979 | Francis et al. . | |
| 4,534,843 | 8/1985 | Johnson et al. . | |
| 4,566,951 | 1/1986 | Norberg et al. | 134/199 |
| 4,775,046 | 10/1988 | Gramarossa et al. . | |
| 4,908,992 | 3/1990 | Cevrero et al. . | |
| 5,024,745 | 6/1991 | Rischke et al. . | |

FOREIGN PATENT DOCUMENTS

| | | | |
|---|---|---|---|
| 1-42632 | 9/1989 | Japan . | |
| 2-277800 | 11/1990 | Japan . | |
| 5-330643 | 12/1993 | Japan . | |
| 1101476 | 7/1984 | U.S.S.R. | 134/122 R |

OTHER PUBLICATIONS

"Tin–Lead Plating on Encapsulated Semiconductor Lead Frames", by Robert Foppen, Metal Finishing, Jan. 1993, pp. 27–31.

Primary Examiner—Frankie L. Stinson
Attorney, Agent, or Firm—Flynn, Thiel, Boutell & Tanis

[57] ABSTRACT

A carrying apparatus comprising an endless roller chain belt that moves on a circular track and includes a plurality of fixture plates. Each fixture plate has several interrupted slot lines each of which comprises vertically elongate lower, middle and upper slot sections, and a work holding device formed with a resilient coil section intermediate a fixing section at an upper end and a work holding section at a lower end. The work holding device being engaged with the slot line such that the coil section seats within the middle slot section and the fixing and work holding sections extend respectively through the upper and lower slot sections to hold a workpiece between the holding section and an edge of the fixture plate. The middle slot section being skewed at an inclined angle with the upper and lower slot section having vertical axes parallel to and spaced one from the other.

5 Claims, 5 Drawing Sheets

CARRYING APPARATUS FOR A THIN SHEET-LIKE WORKPIECE

FIELD OF THE INVENTION

The invention relates to a carrying apparatus for a thin, sheet-like workpiece and more particularly, relates to a lead frame handling apparatus for solder coating leads of the lead frame.

BACKGROUND OF THE INVENTION

Typically, a flat, sheet-like workpiece, for example, a sheet of glass, a small iron sheet which is to undergo galvanizing, a ceramic board, etc., are removed separately from a heaped pile of a plurality of such workpieces prior to processing and thereafter, are transferred to a carrying apparatus. Once transferred to the carrying apparatus the workpiece is automatically transferred thereby to a processing installation, for example, a plating bath or a washing bath, and is immersed therein. After the passage of a predetermined time period, the workpieces are picked up, transferred from the processing installation and released from the carrier so as to be put into a receiver, piece by piece. Many kinds of such carrying systems are well known.

For example, Japanese patent, Hei 1 (1989)-42632, discloses a metal plating method in which, after an electronic device is attached on a lead frame and packaged within synthetic resin, said lead frame is taken out individually from a stocking container or cassette and is clamped by a clamping finger on a continuously moving conveyor. Thereafter, said lead frame is dipped into a plating bath. After the plating has been completed, said lead frame is placed into a container.

In another Japanese Laid-Down patent, Hei 2 (1990)-277800 and in U.S. Pat. No. 4,775,046, other sheet processing apparatuses are publicly disclosed in which resilient means for clamping the sheet-like piece are attached on an endless flat belt such that one end of the resilient clamping means is attached on the belt and a free clamp section, which is on the other free end of said clamping means, serves to clamp the sheet-like piece between the free clamp section and the belt itself.

In the above-described carrying apparatus, however, no description is provided with respect to means which transfers the workpiece without error from a standstill to the clamping device which clamping device is moving together with the movement of the endless belt or conveyor.

Also, in the above-described examples, a chemical solution being used in the processing of the workpiece remains on the clamping section of the fixing or clamping means. Such chemical solution which remains on the clamping section may cause shading or erosion of the workpiece surface after processing.

Still further, the carrying device which incorporates an endless belt or sheet as a main component thereof has the resulting defects wherein the life span of said carrying belt is relatively short and the cost of maintaining or exchanging the old belt with a new one requires considerable expenditure.

An object of the present invention is to provide an inexpensive carrying apparatus, the efficient performance of which is assured by the use of a roller chain.

To solve the aforementioned problems, the carrying apparatus of the invention which is provided for the transport of the thin, sheet-like workpieces comprises an endless roller chain belt that circulates continuously and moves on a circular track. The roller chain belt includes a plurality of mutually adjacent link plates which each include an outer link plate. The roller chain belt further includes a fixing attachment having an L-shaped cross section which fixing attachment is disposed on one side of each outer link plate of the roller chain belt.

A plurality of fixture plates also are secured to the roller chain wherein each fixture plate is fixed on and supported by two mutually adjacent fixing attachments located respectively on each pair of adjacent link plates. Each fixture plate is formed with a plurality of vertical, interrupted slot lines which each preferably comprise three slot sections. The three slot sections are aligned end to end in a spaced apart relation. The fixing plates further include a work holding device or fixture which is formed of a spring wire and includes a single-turn coil section formed intermediate the opposite ends of the work holding device.

The work holding device is oriented along said slot line so that the coil section of the spring wire extends through the middle slot of the three slots described herein and remains on one side of the fixture plate. The opposite ends of the work holding device that are disposed on opposite sides of the coil section respectively define a fixing section and a work holding section which respectively extend through the upper slot section and lower slot section of the three slot sections to the opposite side of the fixture plate. The fixing section is secured to the fixture plate and the work holding section is freely movable toward the fixture plate by the resiliency of the spring wire and away from the fixture plate by a manipulation of the work holding device. Thus, the sheet-like thin workpiece can be held between said work holding section at the end of the coiled-wire work holding device and an end section of the fixture plate.

More particularly, the middle slot of the three slot sections of the vertical slot line is cut with an inclined angle or in other words is skewed relative to the upper and lower slot sections and acts as a seat for supporting the coil section. The inclined angle of the middle slot matches the winding angle of the coil section of the work holding device while the other two slots, i.e. the upper slot and the lower slot, are oriented parallel to a vertical line which defines a main longitudinal axis of the vertical slot line. The vertical axes of the upper and lower slots, however, are disposed so as to be slightly offset on opposite sides of the longitudinal axis with a detached space between the two vertical axes of the upper and lower slots and the main longitudinal axis of the slot line. Thus, the two opposite ends of the coil section, in other words the fixing section and the holding section, are oriented so as to be located on a common vertical line.

The carrying apparatus of the thin sheet-like workpiece also has a square notch which is cut at the lower end of the fixture plate and in which fits the holding section of the holding device which is adjacent the coil section. The square notch opens downwardly from the lower edge of the fixture plate at the lower end thereof. The section of the fixture plate which is disposed between an adjacent pair of said square notches is defected such that the end of the defected section will be disposed or located at a location vertically higher than the liquid level of the chemical liquid in which the workpiece is being immersed, thus preventing the immersing liquid from remaining on the end of the fixture plate after processing.

The carrying apparatus of the thin, sheet-like workpiece also has an insulating ring or mantle made of insulating material which ring is located at a fixing section of a bolt which bolt fixes the fixture plate to the fixing attachment. The bolt also includes an insulation sleeve through which the connecting bolt is inserted and which serves to connect the fixture attachment and the fixture plate to maintain insulation of the connecting bolt from the fixing attachment.

In operation, the workpiece to be processed is held resiliently between the fixture plate and a lower end of the holding section which holding section is the end section of each of the plurality of coil springs extending through the fixture plate.

The defected, square notch of the fixture plate serves to prevent the chemical liquid from remaining at the end of the fixture plate and instead to flow downwardly therefrom. By adjusting the location and shape of the slots, the holding device of the spring coil is firmly fixed.

In addition, the connecting bolt is insulated from the fixing attachment of the chain links and consequently, the fixture plate is also insulated from the fixing attachment. Thus, at a time when an electric current flows through the fixing bolt, the electric current does not leak to other structures of the carrying apparatus other than the fixture plate itself.

Other objects and purposes of the invention, and variations thereof, will be apparent upon reading the following specification and inspecting the accompanying drawings.

Certain terminology will be used in the following description for convenience in reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the apparatus and designated parts thereof. Said terminology will include the words specifically mentioned, derivatives thereof, and words of similar import.

DETAILED DESCRIPTION

The preferred embodiment of the present invention is described in detail herein with reference to FIGS. 1–6. The carrying apparatus of the invention includes two sprocket wheels 3 which are installed on the opposite side walls 5 and 5' of the conveying apparatus which side walls 5 and 5' stand or are supported on a base floor 4 or other support surface. The sprocket wheels 3 are adapted to drive the roller chain belt 2 which serves to carry the workpiece 1 during the processing thereof.

Figure 1:
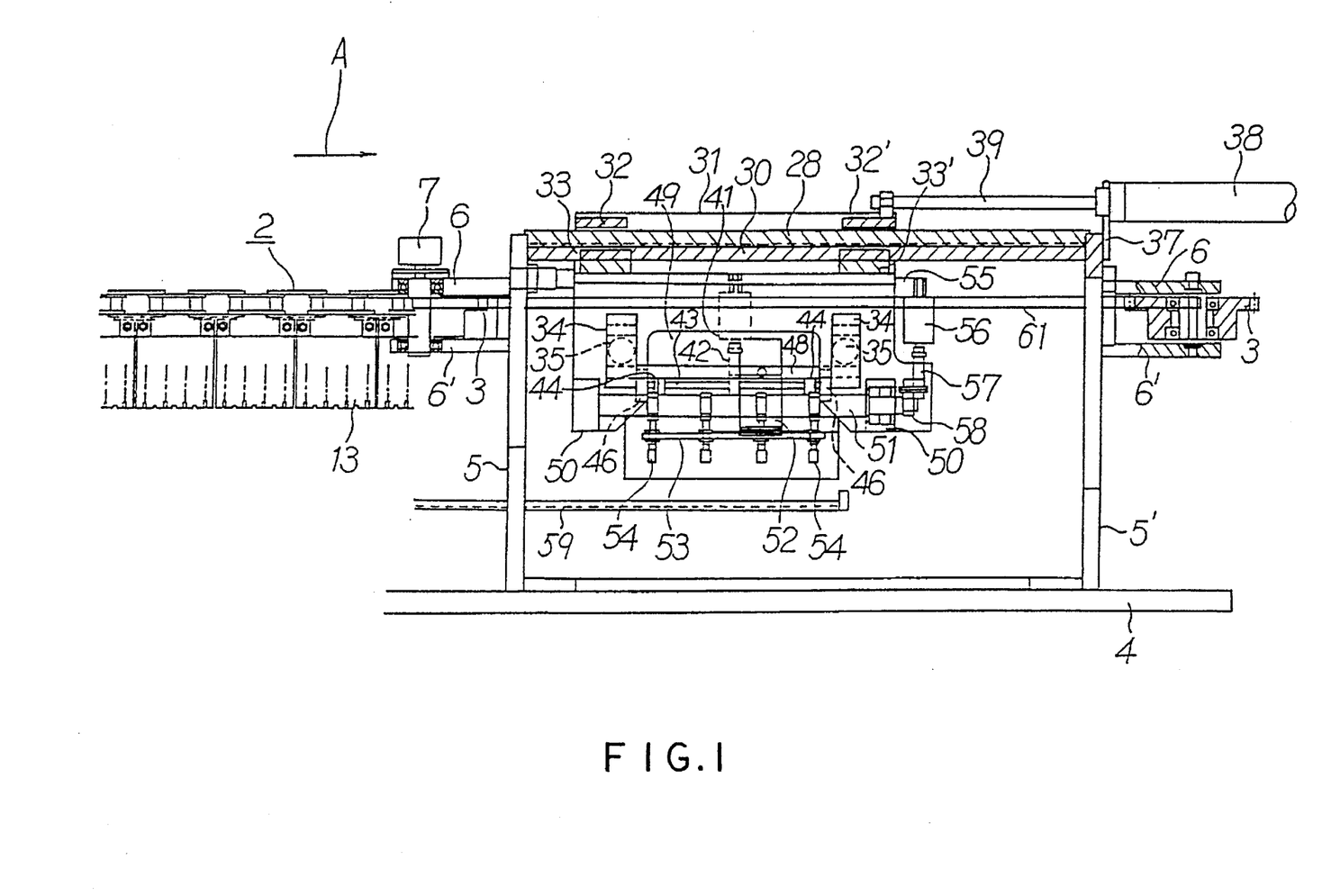
FIG. 1 is a front elevational view of the apparatus embodying the present invention which apparatus is a carrying apparatus for thin, sheet-like workpieces.
Figure 2:
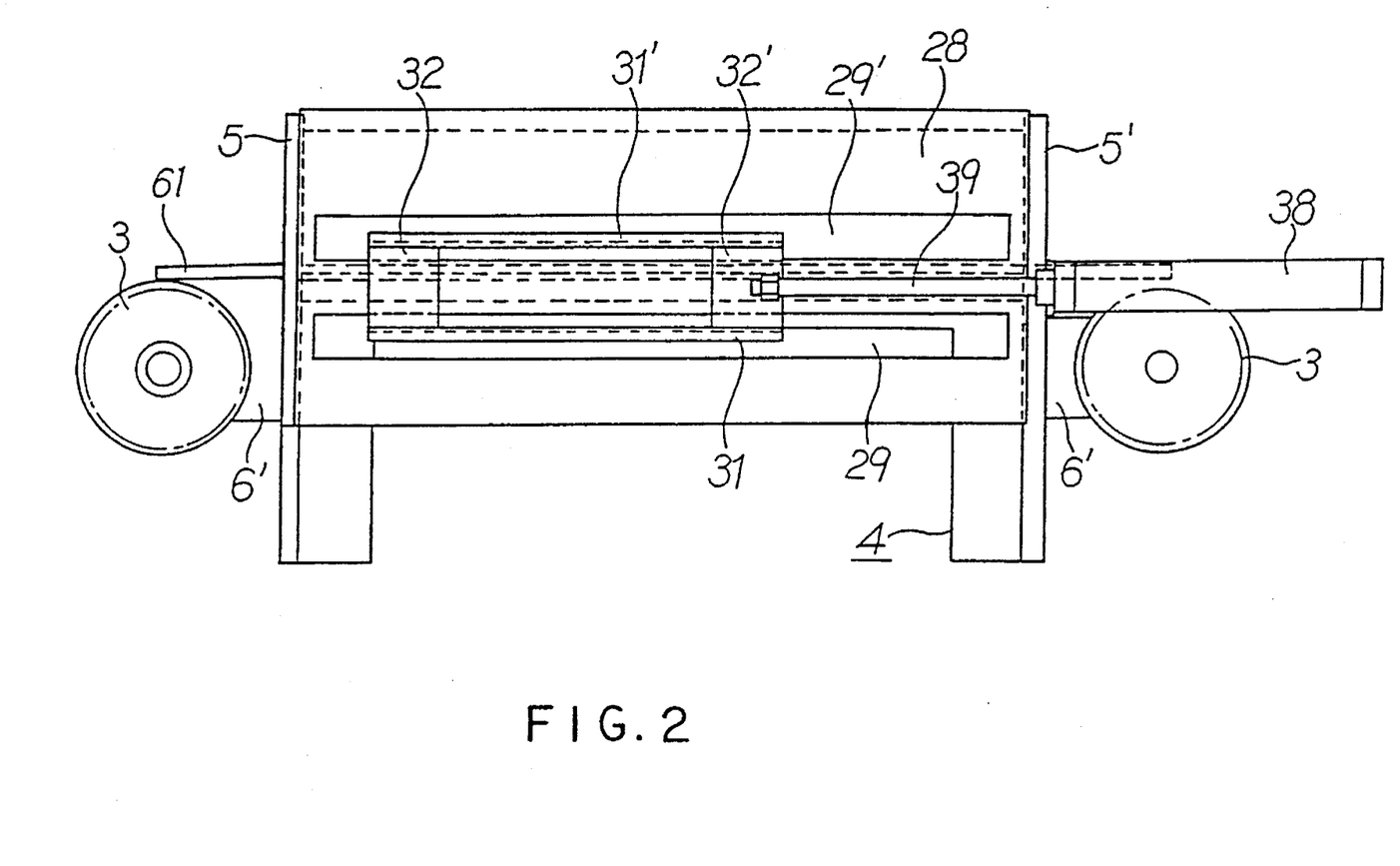
FIG. 2 is a plan view of the carrying apparatus illustrated in FIG. 1.

More specifically, the two sprocket wheels 3 are each rotatably supported by an upper side plate 6 and an opposing lower side plate 6' which are disposed in a spaced apart relation with a respective one of the sprocket wheels 3 disposed therebetween. Each side plate 6 and 6' extends sidewardly from said respective side walls 5 and 5' and receives one end of a sprocket shaft in rotatable engagement so as to permit the sprocket wheels 3 to rotate freely substantially about vertical axes. A driving power source 7 is mounted on one of the side plates 6 or 6', for example, on the leftward upper side plate 6 as can be seen in FIGS. 1 and 2 which driving power source 7 drives one of the two sprocket wheels 3. The driving power source 7 is an electrical motor or other suitable apparatus.

Figure 5:
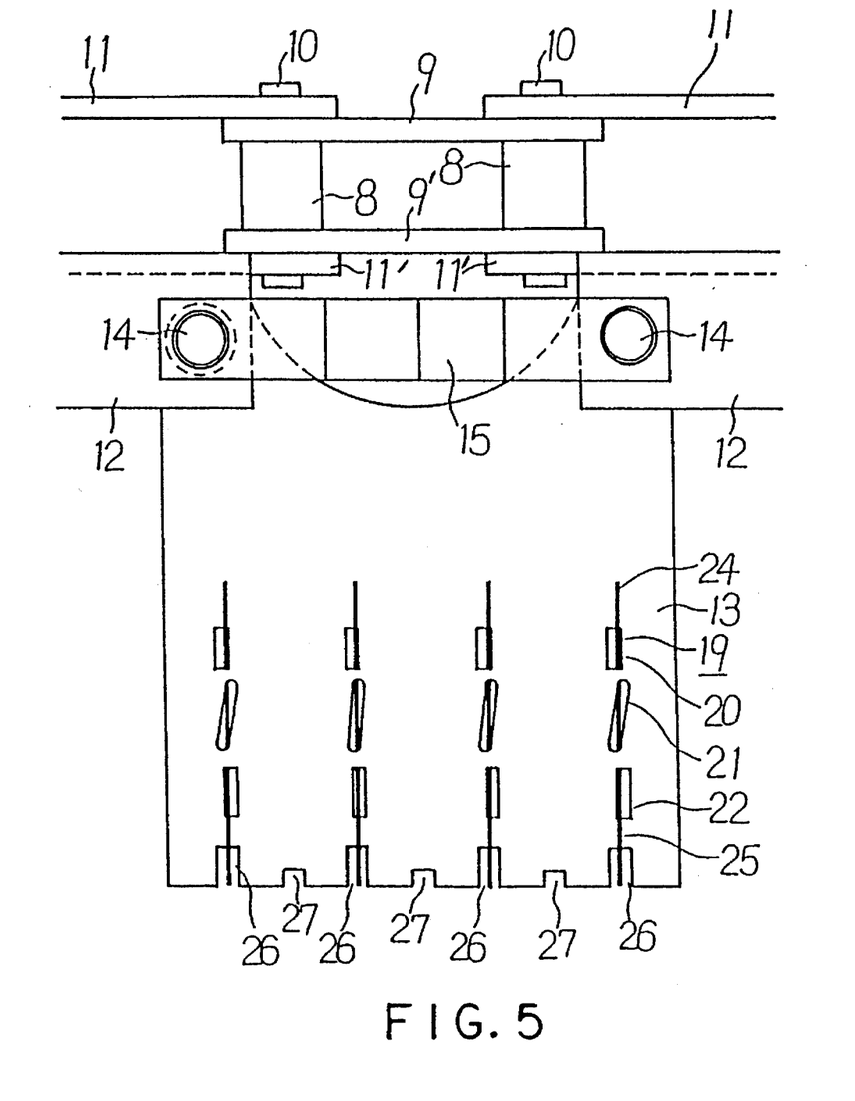
FIG. 5 is a partial enlarged front elevational view of the roller chain and fixture plate illustrated in FIG. 4.

Referring to FIG. 5, the roller chain 2 includes a plurality of chain links which each include upper and lower inner link plates 9 and 9' respectively which rotatably hold adjoining rollers 8 between them which rollers 8 are disposed proximate the opposite ends of the inner link plates 9 and 9'. The two inner link plates 9 and 9' are connected together by a pair of link pins 10 which extend longitudinally through the rollers 8.

Outside link plates 11 and 11' also are included which are disposed outwardly above and below the inner link plates 9 and 9'. The outside link plates 11 and 11' have an end connected adjacent the inner link plates 9 and 9' by the link pins 10 and extend away from the inner link plates 9 and 9' along the longitudinal length of the roller chain 2. The lowermost outside link plate 11' also includes a fixing attachment 12 which has an L-shaped cross section having a downwardly depending vertical part extending in a vertical plane. The fixing attachment 12 terminates away from the link pins 10 so as not to cover the connecting point of the outer link plate 11'. The fixing attachment 12 also includes an aperture formed through the vertical part proximate each link pin 10.

A square fixture plate 13 is fixed to the roller chain 2 so as to be supported at the opposite edges thereof by connection of the fixture plate 13 to mutually adjacent fixing attachments 12. More specifically, the fixture plate 13 extends between the mutually adjacent fixing attachments 12 and includes apertures through the upper corners of the fixture plate 13 which apertures are located so as to be in registry with the corresponding apertures of the fixing attachments 12. The connection of the fixture plate 13 to the corresponding fixing attachments 12 is accomplished by bolts 14 which are inserted therethrough and secured.

Figure 4:
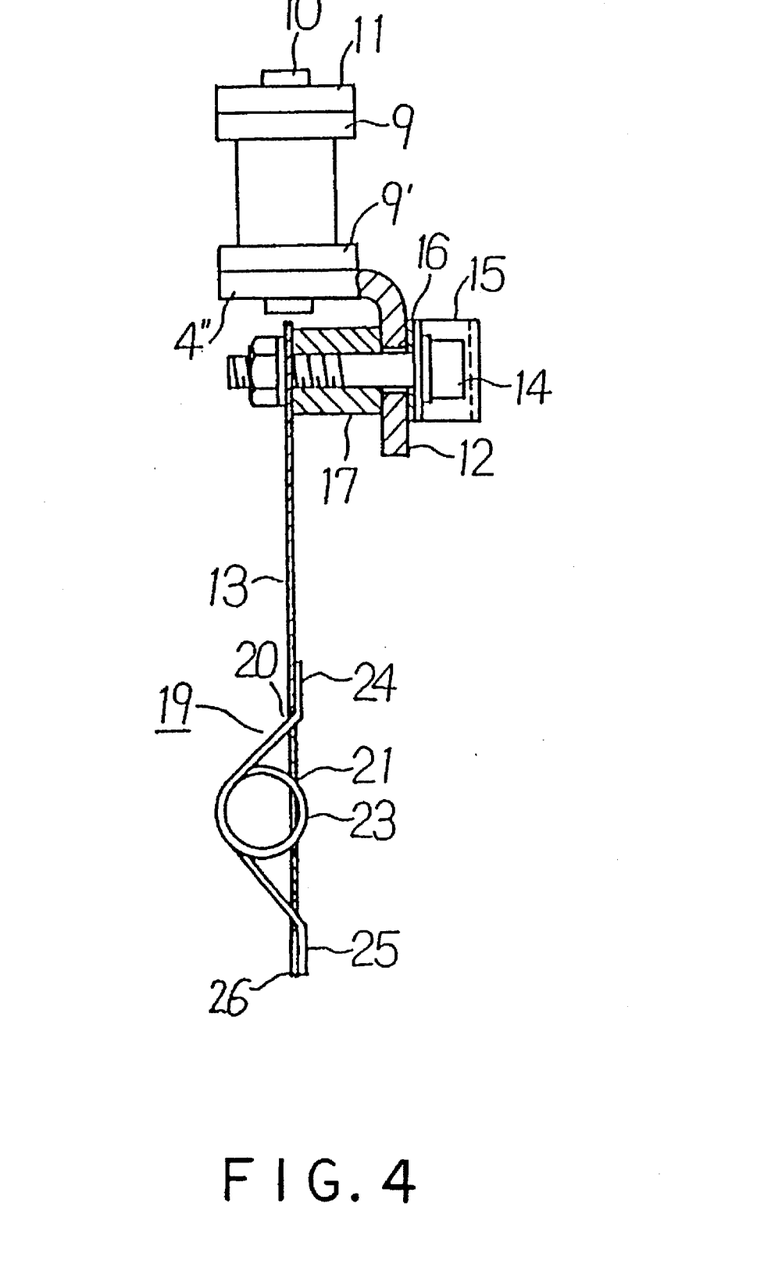
FIG. 4 is an enlarged cross sectional view of a roller chain and a fixture plate attached thereto of the apparatus illustrated in FIG. 3.

As can be seen in FIG. 4, when connecting the fixture plate 13 to the fixing attachment 12, a corrugated conductor plate 15 is disposed against the rightward facing surface of the fixing attachment 12 so that apertures formed through the corrugated conductor plate 15 are in registry with the corresponding aperatures of the fixing attachment 12 and the fixture plate 13. The bolts 14 are inserted through the conductor plate 15, the fixing attachment 12 and the fixture plate 13 as well as an insulating ring 16 which separates the conductor plate 15 and bolt 14 from the fixing attachment 12. In addition, a tubular insulating sleeve 17 is seated on the bolt 14 between the fixing attachment 12 and the fixture plate 13. The bolts 14 fix the aforementioned structures together such that the insulating sleeve 17 is held therebetween and thus, an electrode 18 illustrated in FIG. 6 can contact the conductor plate 15 and send an electric current through to the fixture plate 13 by said contact with the conductor plate 15.

As shown in FIGS. 4 and 5, the fixture plate 13 is formed with a plurality of parallel vertically oriented slot lines through the surface thereof wherein each slot line is formed by three vertically elongated slot sections 20, 21 and 22 which are vertically arranged end to end. Each slot line is cut so as to have spaced apart intervals along the vertical direction to separate each individual slot section 20, 21 and 22 one from the other.

To secure a work holding or clamping fixture 19 which holds the workpiece 1, the three slot sections 20, 21 and 22 are used. The work holding fixture 19 is constructed in one piece of spring wire and includes a coil section 23 preferably having one turn although additional turns may be provided to increase the resiliency of the coiled-spring work holding fixture 19. This coil section 23 is disposed between an elongate and cantilevered fixing section 24 at the upper end of the work holding fixture 19 and an elongate and cantilevered work holding section 25 at a bottom end of said fixture 19. The work holding fixture 19 is engaged with the slot line such that a part of the coil section 23 is inserted into and seated within the middle slot 21. In addition, the fixing section 24 disposed upwardly and adjacent to the spring coil 23 is inserted through the upper slot 20 and has an upper free end part thereof which remains on the side of the fixture plate 13 opposite the side where the spring coil 23 is disposed and which projects upwardly from the slot 20 for engagement with the side of the fixture plate 13. The working holding section 25 of the coil end 25 similarly is inserted through the lower slot 22 and has a lower free end part which remains on the side of the fixture plate 13 opposite the side where the coil section 23 is located and which projects downwardly from the slot 22 and engages the opposite side of the fixture plate 13. Furthermore, the middle slot 21 is cut with an inclined angle or in other words is skewed relative to the upper slot 20 and the lower slot 22 which inclined angle matches the winding angle of the coil section 23 of the working holding device 19. As can be seen in FIG. 5, the upper slot 20 and the lower slot 22 are not vertically aligned but are oriented with their longitudinal axes vertically parallel. More specifically, the axes of the upper slot 20 and the lower slot 22 are offset so as to be spaced slightly sidewardly one from the other so as to keep the opposite ends 24 and 25, i.e. the fixing section 24 and the work holding section 25, of the coiled work holding fixture 19 aligned in a common vertical downwardly oriented direction. The distal end of the work holding section 25 of the coiled work holding fixture 19 is located adjacent the open interior portion of a notch 26 which notch 26 is cut in the fixture plate 13 at a lower free end thereof. A plurality of these notches 26 are provided along the lower edge. It is believed that the notches 26 provide better contact with the workpiece 1 where the work holding fixture 19 serves as one contact point with opposed contact being provided on the other side of the workpiece 1 at two sidewardly spaced sections of the fixture plate 13 adjacent the notch 26.

The fixture plate 13, which includes the work holding members 19, also includes a plurality of rectangular cutout portions 27 at the lower end thereof which cutout portions 27 are disposed between adjacent pairs of the square notches 26. This row of cutout portions 27 located along the lower edge of the fixture plate 13 are adapted to be located vertically above the height of the liquid level of the chemical solution being applied, thus preventing contact of the liquid with the edge of the fixture plate 13.

Referring to FIGS. 1 and 2, the carrying apparatus of the invention includes a top plate 28 that is supported by and extends between the two side walls 5 and 5' which side walls 5 and 5' both are supported on the base surface 4. The top plate 28 includes two guide grooves 29 and 29' which are oriented so as to be in a spaced parallel relation and be parallel with a moving direction of the chain belt 2.

A guide 30 is fixed to a bottom surface of the top plate 28 and intermediate the two guide grooves 29 and 29' and extends between the two side walls 5 and 5'. Two backing plates 31 and 31' extend through, are movable along the two guide grooves 29 and 29' and are connected one with the other by two saddle plates 32 and 32'. The two saddle plates 32 and 32' are secured to the backing plates 31 and 31' at the opposite ends thereof and extend between the backing plates 31 and 31' so as to join the two together. The two backing plates 31 and 31' also include two U-shaped guide pieces 33 and 33' (FIGS. 1 and 3) which are secured to the lower edges of the backing plates 31 and 31' so as to be below the top plate 28. The U-shaped guide pieces 33 and 33' open upwardly so as to receive the guide 30 therein and guide the movement of the backing plates 31 and 31' along the guide grooves 29 and 29'.

Each of the two backing plates 31 and 31' also include cylinder support blocks 34 and 34' which are located on the outside surfaces proximate the lower ends of the backing plates 31 and 31'. On the cylinder support blocks 34 and 34', two pressure cylinders 35 and 35' are secured for clamping the fixture plate 13 which cylinders 35 and 35' are secured so as to be actuatable in an inward direction. Each piston of the clamping cylinders 35 and 35' has a ring clamp pad 36 at the head thereof which ring clamp pad 36 serves to clamp the fixture plate 13. Since two cylinders 35 and 35' are disposed so as to be actuatable toward each other, the ring clamp pads 36 serve to clamp the fixture plate 13 from both sides thereof during operation. As the clamping heads 36 secure the fixture plate 13, the two backing plates 31 and 31' are moved in the direction indicated by arrow A in FIG. 1. A pressure cylinder 38 serves to return the backing plates 31 and 31' which cylinder 38 is fixed on one of the side walls 5' by a plate 37. An end of a cylinder rod 39 of the cylinder 38 is fixed to one of the saddle plates 32'. As a result, the two backing plates 31 and 31' or more particularly, a loader assembly which comprises the aforesaid structure, are moved back by the action of the rod 39 of the cylinder 38.

Figure 3:
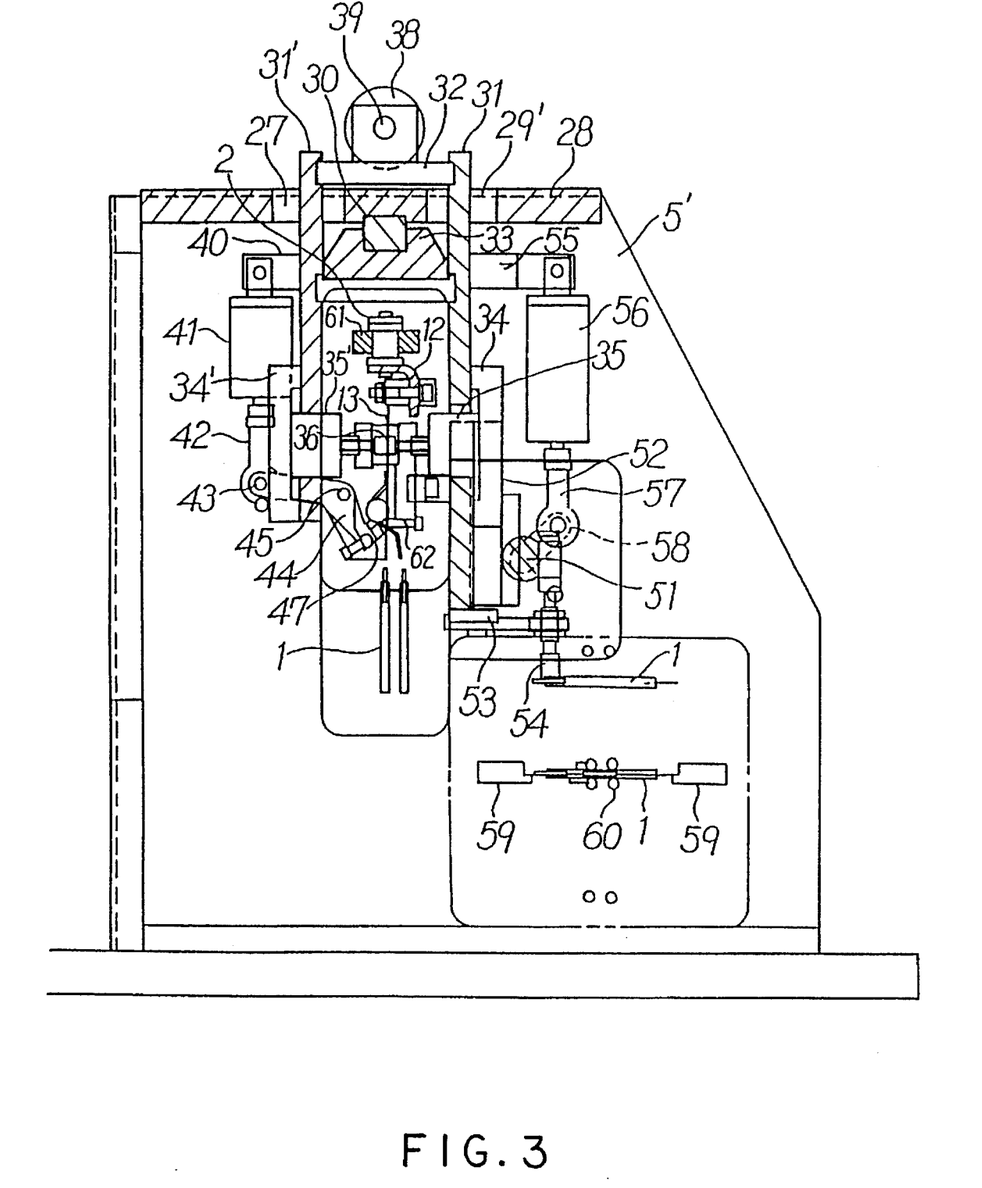
FIG. 3 is an enlarged cross sectional side view of the carrying apparatus.

On one of the backing plates 31', a pressure cylinder 41 is secured to a support plate 40 which cylinder 41 is provided to actuate the work holding device or clamp spring 19 of the fixture plate 13 described herein as can be seen in FIG. 3. The cylinder 41 is mounted on the open outward side of the backing plate 31 intermediate the opposite ends and at an upper portion thereof. A piston rod 42 of the cylinder 41 is oriented so as to travel along a vertical path and is secured to an actuation bar 43 at its middle point. Two bell cranks 44 are supported by a pivot shaft 45, which shaft 45 is supported by two bearings which are secured at each end of the backing plate 31'. The shaft 45 passes through the center of the bell cranks 44 wherein one end of the two bell cranks 44 is rotatably secured with the above-mentioned actuation bar 43. The other end of the two bell cranks 44 is secured to a pushing bar 47, which pushing bar 47 contacts underneath the coil section 23 for pushing the work holding device 19 that is secured on the fixture plate 31. To permit free passage of the bell cranks 44 and other components through the backing plate 31', the backing plate 31' includes an actuation hole 48 therethrough as illustrated in FIG. 1.

On the other backing plate 31, or more particularly the backing plate 31 depicted in the front of the carrying apparatus in FIG. 1, a middle lower section is cut off so as to form a square, cutout hole 49 which opens downwardly. Bearings 50 are fixed at the lower ends of the backing plate 31 and rotatably support an actuation shaft 51 therebetween.

The bearings 50 support the actuation shaft 51 while permitting the shaft 51 to freely rotate. A pressure cylinder 52 is fixed to a backside of the actuation shaft 51 so as to move a vacuum chuck head 54 which is secured to a vacuum chuck holding plate 53.

More particularly, the vacuum chuck actuation cylinder 52 operates the vacuum chuck holding plate 53 normally oriented horizontal which vacuum chuck holding plate 53 includes a plurality of vacuum chuck heads 54 that are secured to said chuck holding plate 53. With the vacuum chucks 54, the workpiece 1 is attracted to the chuck heads 54 and held thereto during operation.

The vacuum chuck actuating shaft 51 projects at one end through the support bearing 50 which protruding section of the shaft 51 connects with a link 58. A piston rod 57 of the pressure cylinder 56, which is located on one side of the backing plate 31, also connects with another end of the link 58. By a vertical movement of the piston rod 57, the vacuum chuck actuation shaft 51 turns in conjunction with movement of the link 58. As a result, the vacuum chuck holding plate 53 changes its orientation from a horizontal orientation to a vertical orientation or visa versa.

Referring to FIGS. 1 and 3, the workpiece 1 is supplied to the carrying apparatus by guide means 59 which guide means 59 supports a roller chain. A pair of the guide means 59 are provided in a spaced apart relation so as to carry the workpiece 1 therebetween. In addition, a carrying section 60 is provided for supporting the workpiece 1 in a horizontal orientation. FIG. 3 illustrates the workpiece 1 in the initial horizontal position for the workpiece 1 prior to operation of the carrying apparatus.

To maintain alignment of the roller chain 2 during operation, a support guide 61 is secured to the carrying apparatus so as to be adjacent the sprocket wheel 3 as illustrated in FIGS. 2 and 3.

To further support the fixture plate 13 when the pushing element 47 pushes against a lower part of the clamping section 25 underneath the coiled section 23 which necessarily applies a bending force thereto, a supporting plate 62 is secured in a predetermined position on the side of the fixture plate 13 opposite the pushing element 47. The supporting plate 62 acts in conjunction with actuation of the clamping pads 36 to counter the bending force and prevent sideward movement of the fixture plate 13.

In operation, the workpiece 1 is supplied to the carrying apparatus by the roller chain that is supported by the guide means 59 and by the carrying section 60. At this time, the workpiece is in a horizontal position as illustrated in FIG. 3.

To remove the workpiece 1 from the carrying section 60, the vacuum chuck holding plate 53 descends toward the workpiece 1 by movement of the vacuum chuck actuation cylinder 52. The workpiece 1 which had been carried along the guide way 59 thereafter is held by the suction applied thereto by a plurality of the vacuum chucks 54 and is lifted upwardly from the guide way 59. Thereafter, the cylinder 56 is actuated and moves the link 58 to turn the vacuum chuck actuation shaft 51. Rotation of the actuation shaft 51 causes the vacuum chuck holding plate 53 to rotate in conjunction therewith from the previous horizontal orientation to a vertical orientation in preparation for processing of the workpiece 1 with a chemical bath. Thus, the workpiece 1 is held by the vacuum chuck 54 so as to be disposed just below the fixture plate 13 in a vertical orientation.

Next, the fixture plate 13, which is hanging under the roller chain 2, moves in the direction of arrow A illustrated in FIG. 1 and travels to a desired location such that the fixture plate 13 is disposed between the two backing plates 31 and 31'. The clamp cylinders 35 and 35' are actuated such that the clamping pads 36 thereof serve to clamp the fixture plate 13 from opposite sides. Consequently, the backing plates 31 and 31' are secured or joined with the fixture plate 13 by the aforesaid clamping device and move in conjunction with the fixture plate 13 along the guide bar 30.

Meanwhile, during this movement of the backing plates 31 and 31' in conjunction with the fixture plate 13 together with the roller chain 2, the clamp actuation cylinder 41 is actuated and the actuation shaft 43 descends. This downward movement of the actuation shaft 43 causes the pushing bar or board 47 to be shifted upwardly by the rotational movement of the bell crank 44. This upward shifting of the pushing bar 47 causes the pushing bar 47 to contact and push against the clamping sections 25 of the holding members 19 just below the coil sections 23 thereof. As a result, the lower free end of the clamping section 25 is detached and moves away from the lower edge of the fixture plate 13 and becomes free therefrom.

Then, instantly, the vacuum head actuating cylinder 52 is actuated in a vertical upward movement such that the workpiece 1 ascends and is positioned between the fixture plate 13 and the lower free end part of the clamping section 25 of the coiled wire holding fixture 19.

Next, the clamping spring actuation cylinder 41 is actuated in the opposite direction so that the pushing bar 47 is removed from contact with the lower side of the coil section 23 which thus permits the work holding fixture 19 to return in response to the resiliency thereof. The spring coil work holding device 19 thereafter clamps the workpiece 1 by its spring action such that the workpiece 1 is clamped between the end of the fixture plate 13 and the lower free end part of the clamping section 25.

Subsequently, the vacuum chuck 54 is disengaged and the suction provided thereby is removed to release the workpiece 1 which now is held by the operation of the holding device 19. The fixture plate clamping cylinders 35 and 35' are actuated in a reverse direction and the fixture plate 13 is released from the backing plates 31 and 31'. After that, the cylinder 38 is actuated to return the two backing plates 31 and 31' in the direction opposite direction A to their initial position. The vacuum chuck actuation cylinder 56 also is actuated in a reverse direction and the vacuum chuck holding plate 53 is returned to its initial horizontal orientation.

The fixture plate 13 which now holds the workpiece 1, moves in conjunction with the roller chain 2 and transfers the workpiece 1 to a predetermined location where the chemical treatment is done.

Figure 6:
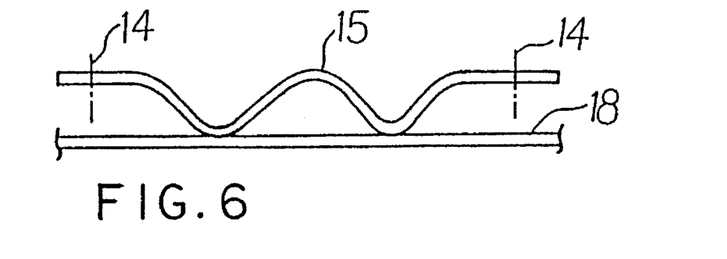
FIG. 6 is a partial plan view showing the relationship of the fixture plate to the conductor plate.

As indicated in FIG. 6, the workpiece 1 is provided with an electric current while it moves in conjunction with the fixture plate 13 which electric current is provided by means of the electrode 18 which contacts the conductor plate 15 and is transferred through to the fixture plate 13 through the bolt 14. The chain 2 and the fixing attachment 12 are electrically isolated from the electric current by providing the insulation ring 16 and insulation sleeve 17 such that the electric current is only permitted to pass through the bolt 14 to the fixture plate 13 and through to the workpiece 1.

With the structures described herein, the carrying apparatus is provided with a simple construction so that loading and unloading of the workpiece 1 is readily completed in a simple manner. In addition, maintenance of the apparatus is simplified.

When this apparatus is used for treating the workpiece 1 by immersion in the chemical solution, such as a plating solution, the amount of the chemical solution which remains on the workpiece also can be kept at a minimum. Other advantages result, for example, in the case where the apparatus is used for a galvanizing process and an electric current flows through the apparatus as is required for such a process, an equal density of electric current will flow through the device to the bath and a uniform finishing can be assured thereby.

It should be understood that various types of clamping devices may also be used with the apparatus of the invention.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A carrying apparatus for a thin, sheet-like workpiece comprising an endless roller chain belt which circulates continuously and moves about a circular track, said roller chain belt comprising a plurality of chain links each having at least one outer link plate and including a fixing attachment on one side of each said one outer link plate of said roller chain belt which said fixing attachment has an L-shaped cross section, said carrying apparatus further including a fixture plate which is fixed to and supported by two mutually adjacent outer link plates, said fixture plate having a plurality of vertical, interrupted slot lines, which each comprise at least three slot sections which define an upper slot section, a middle slot section and a lower slot section, and a work holding device which is made of spring wire and formed with a coil intermediate the opposite ends thereof which said opposite ends are a fixing section and a work holding section, said work holding device being engaged with one said slot line with said coil section being seated within said middle slot section so as to be disposed on a first side of said fixture plate, and said fixing section and said work holding section extending respectively through said upper slot section and said lower slot section so as to respectively have upper and lower parts disposed on a second side opposite said first side, said work holding section being resiliently movable so as to hold the sheet-like workpiece between the lower part of said work holding section and an end section of said fixture plate.

2. The carrying apparatus according to claim 1, wherein said slot line is vertical and said middle slot section of said three slot sections is cut at a slightly inclined angle which corresponds to a winding angle of said coil section, said upper slot section and said lower slot section being oriented vertical with the vertical axes thereof being parallel one with the other and spaced apart a predetermined distance so as to maintain said fixing section and said work holding section vertically aligned one with respect to the other.

3. The carrying apparatus according to claim 1, wherein a square notch is cut at said end section of said fixture plate adjacent each said slot line in which fits said work holding section which is adjacent said coil section, said end section between an adjacent pair of said square notches being notched to define a cutout section which said cutout section locates at a vertically higher location than a liquid level of an immersing liquid being applied to said workpiece to prevent said immersing liquid from remaining on said end section of said fixture plate.

4. The carrying apparatus according to claim 1, which includes a bolt which fixedly secures said fixture plate to each said fixing attachment, an insulating ring being disposed between said fixing attachment and a bolt end on one of said first and second sides which is opposite said fixture plate, and an insulating sleeve being disposed about said bolt between said fixing attachment and said fixture plate, said insulating ring and said insulating sleeve being an insulating material to insulate said fixing attachment from said bolt and said fixture plate.

5. The carrying apparatus according to claim 1, wherein said coil section is defined by a single coil of said spring wire.

* * * * *